(12) United States Patent
Bozic et al.

(10) Patent No.: US 10,406,914 B2
(45) Date of Patent: Sep. 10, 2019

(54) VEHICLE-MOUNTED HYDRAULIC ASSISTANCE DEVICE AND METHOD FOR EVACUATING SUCH A DEVICE

(71) Applicant: POCLAIN HYDRAULICS INDUSTRIE, Verberie (FR)

(72) Inventors: Ante Bozic, Verberie (FR); Bastien Clapit, Verberie (FR); Julien Lambey, Verberie (FR)

(73) Assignee: POCLAIN HYDRAULICS INDUSTRIE, Vergerie (FR)

( * ) Notice: Subject to any disclaimer, the term of this patent is extended or adjusted under 35 U.S.C. 154(b) by 9 days.

(21) Appl. No.: 15/557,743

(22) PCT Filed: Mar. 10, 2016

(86) PCT No.: PCT/EP2016/055192
§ 371 (c)(1),
(2) Date: Sep. 12, 2017

(87) PCT Pub. No.: WO2016/146489
PCT Pub. Date: Sep. 22, 2016

(65) Prior Publication Data
US 2018/0065479 A1    Mar. 8, 2018

(30) Foreign Application Priority Data
Mar. 13, 2015    (FR) ..................... 15 00495

(51) Int. Cl.
*F16D 31/02*    (2006.01)
*B60K 17/10*    (2006.01)
(Continued)

(52) U.S. Cl.
CPC .......... B60K 17/10 (2013.01); B60K 17/354 (2013.01); B60K 17/356 (2013.01); F16H 61/4104 (2013.01); F16H 61/4139 (2013.01)

(58) Field of Classification Search
CPC ............. F16H 61/4104; F16H 61/4131; F16H 61/4139
(Continued)

(56) References Cited

U.S. PATENT DOCUMENTS 2,961,829 A   11/1960  Weisenbach
3,866,421 A * 2/1975  Kersten ............... F16H 61/4139
                                                    60/464
(Continued)

FOREIGN PATENT DOCUMENTS

DE   102009011247 A1 *  9/2010 ......... F16H 61/4139
EP   0059485 A1         9/1982
FR   2996176 A1         4/2014

OTHER PUBLICATIONS

Preliminary Research Report received for French Application No. 1560843, dated Jul. 1, 2016, 2 pages (1 page of French Translation Cover Sheet and 1 page of original document).
(Continued)

*Primary Examiner* — Michael Leslie
(74) *Attorney, Agent, or Firm* — Womble Bond Dickinson (US) LLP

(57) ABSTRACT

The invention relates to a device comprising a first hydraulic apparatus (M1) and a second hydraulic apparatus (M2), the two motors (M1, M2) being connected by a first line (11) and a second line (12) enabling the admission or discharge of the oil in said motors (M1, M2), a booster pump (30), arranged between a tank and a booster line, the booster line communicating with at least one of said lines (11, 12), characterized in that the pump (30) is configured to be able to suck oil into the booster line in order to allow the decompression of said first and second lines (11, 12). The invention also relates to a method for evacuating a device of the type described above, in which the booster pump (30) is activated in suction
(Continued)

Figure 1:
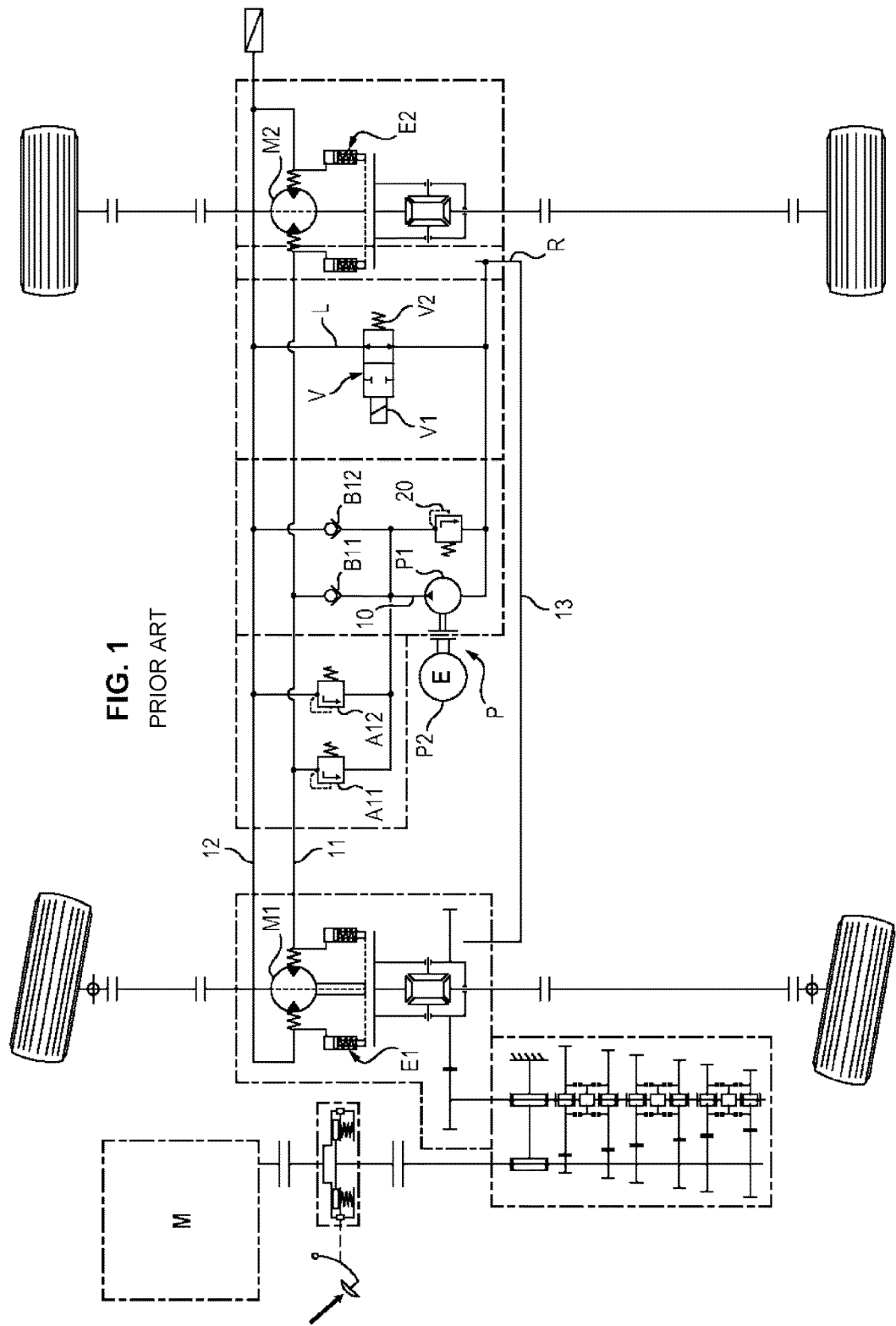

mode in the booster line to enable the disengagement of the machines (M1, M2).

17 Claims, 9 Drawing Sheets

(51) Int. Cl.
    *F16H 61/4104*    (2010.01)
    *F16H 61/4139*    (2010.01)
    *B60K 17/356*     (2006.01)
    *B60K 17/354*     (2006.01)

(58) Field of Classification Search
    USPC .......................................................... 60/464
    See application file for complete search history.

(56) References Cited

U.S. PATENT DOCUMENTS

| | | | |
|---|---|---|---|
| 4,244,184 A | | 1/1981 | Baldauf et al. |
| 4,696,162 A | | 9/1987 | Williams |
| 6,837,047 B2 | * | 1/2005 | Dong ................. F16H 61/4139 60/464 |
| 9,604,537 B2 | * | 3/2017 | Heren ................. B60K 17/105 |
| 9,816,534 B2 | * | 11/2017 | Krittian ............... F16H 61/4096 |
| 2005/0097887 A1 | | 5/2005 | Landhuis |
| 2005/0247189 A1 | | 11/2005 | Hazzard et al. |
| 2011/0240897 A1 | | 10/2011 | Gepraegs et al. |
| 2014/0251464 A1 | | 9/2014 | Apadula et al. |
| 2015/0251533 A1 | | 9/2015 | Heren et al. |
| 2017/0015197 A1 | * | 1/2017 | Lambey .............. F16H 61/4139 |
| 2017/0328469 A1 | * | 11/2017 | Le Dren ............. F16H 61/4104 |

OTHER PUBLICATIONS

Preliminary Research Report received for French Application No. 1555295, dated May 2, 2016, 2 pages (1 page of French Translation Cover Sheet and 1 page of original document).
Preliminary Research Report and Written Opinion received for French Application No. 1500495, dated Feb. 12, 2016, 7 pages (1 page of French Translation Cover Sheet and 6 pages of original document).
Poclain Hydraulics Industrie, "International Search Report and Written Opinion," PCT Application No. PCT/EP2015/076491 (dated Feb. 22, 2016) (with English translation cover sheet).
International Search Report and Written Opinion received for PCT Patent Application No. PCT/EP2016/063379, dated Aug. 31, 2016, 19 pages (9 pages of English Translation and 10 pages of Original Document).
International Search Report and Written Opinion received for PCT Patent Application No. PCT/EP2016/055192, dated Jun. 8, 2016, 14 pages (7 pages of English Translation and 7 pages of Original Document).
International Preliminary Report on Patentability received for PCT Patent Application No. PCT/EP2016/063379, dated Dec. 21, 2017, 14 pages (8 pages of English Translation and 6 pages of Original Document).
International Preliminary Report on Patentability received for PCT Patent Application No. PCT/EP2016/055192, dated Sep. 28, 2017, 12 pages (7 pages of English Translation and 5 pages of Original Document).
International Preliminary Report on Patentability received for PCT Patent Application No. PCT/EP2015/076491, dated Sep. 28, 2017, 13 pages (7 pages of English Translation and 6 pages of Original Document).
European Search Report and Written Opinion received for EP Patent Application No. 16205571.9, dated Jun. 7, 2017, 6 pages of Original Document Only.

* cited by examiner

VEHICLE-MOUNTED HYDRAULIC ASSISTANCE DEVICE AND METHOD FOR EVACUATING SUCH A DEVICE

GENERAL TECHNICAL FIELD

The invention belongs to the field of vehicle hydraulic assistance and in particular the engagement and the disengagement of this assistance.

Temporary hydraulic assistance is carried out using hydraulic machines which may supply torque to wheels not mechanically motorized. These machines transform the hydraulic energy of pressurized oil into mechanical energy, or the reverse.

Two phases of use are defined: the assistance phase which allows an increase in power/torque, and a freewheel phase. Between these two phases are two transient phases allowing engaging or disengaging hydraulic assistance.

To activate such assistance, the hydraulic circuits are pressurized thanks to a booster pump. This pressure serves in particular for engaging the motors.

PRIOR ART

FIG. 1 details more precisely a hydraulic schematic of the prior art.

In a vehicle V, a first hydraulic machine M1 is mounted on the front axle and a second hydraulic machine M2 is mounted on the rear axle. What is meant by machines is that they may function as motors or as pumps.

The configuration shown corresponds to a "bicycle chain" (document FR 2 996 176), meaning that during the main use, the first machine M1 acts as a pump for the second machine M2, which acts as a motor.

To this end, the discharge of the first machine M1 is connected to the intake of the second machine M2 by a line 11 called a high pressure line and the discharge of the second machine M2 is connected to the intake of the first machine M1 by a line 12 called a low pressure line.

The terms high and low pressure correspond to use when driving forward with torque addition ("main use").

Consequently, as pressure may be reversed, the terms first line 11 and second line 12 are preferred.

An electric pump unit P, with a booster pump P1 in particular, and an electric motor P2, is provided for boosting lines 11, 12.

By way of an example, the booster pump P1 may also be fed by other elements, such as an axle or a heat engine M.

A pressure limiter 20 is located so that it by-passes the pump P1 for protecting it from possible excess pressure.

The booster pump P1 feeds, through a booster line 10, the first and second lines 11, 12 via two check valves B11, B12 which prevent the oil from being discharged toward the pump P1 when the boost pressure is less than the operating pressures.

The oil comes from a drainage line 13 which is connected to one or more reservoirs R.

Conventionally, two pressure limiters A11, a12 protect the first and second lines 11, 12 from excess pressure by discharging oil into the booster line 10.

The hydraulic circuit also has a vacuum valve V situated on a vacuum line L.

The vacuum line connects the first or the second line 11, 12 (a selector valve may if necessary be placed between the lines 11 and 12) to the drainage line 13 which leads to the reservoir R.

The valve V is a 2/2 way valve, comprising an inlet and an outlet. The inlet is connected to the line 12 and the outlet to the drainage line 13. The valve V has a passing state and a blocking state.

The change toward a blocking state occurs using a solenoid spool V1, which is controlled electronically. This change of state causes a first transient phase by allowing the effective activation of the hydraulic assistance because the high and low pressure lines 11, 12 are then no longer connected to the reservoir R and may increase in pressure. This pressure increase allows the couplers E1 and E2, which link the components of the hydraulic machines M1 and M2 to the output shafts of said machines, to be activated, so as to make them active in the vehicle, in other words to engage the system. These couplers may be of the disk or claw clutch type, for example of the same type as in the prior art gearbox. They may also constitute the coupling of radial piston motors which disengage from their cam by retraction of the pistons.

Conversely, a spring V2 holds in the rest position the valve V, in a passing state. As soon as the spool V1 is no longer controlled, the valve V resumes a passing position and causes a second transient phase, wherein the pressure in the low pressure line V2 drops, thus disengaging the hydraulic assistance.

Figure 2:
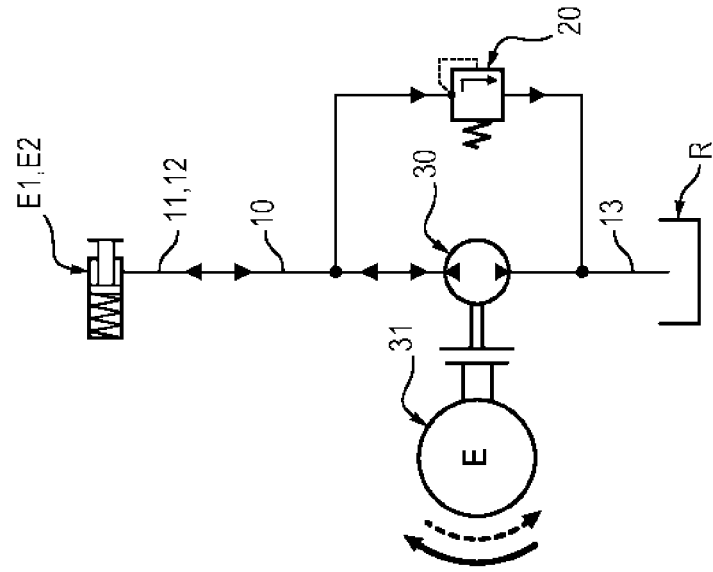

FIG. 2 shows a simplified alternative with a valve V' which, in the rest position, opens the vacuum line L and blocks the booster line 10, and vice versa in the controlled position. This valve V' is also electrically controlled by a solenoid.

Thus, for these two transient steps, it is necessary to intervene electronically on several elements, and in particular the valves V, V' and the booster pump, which imposes structural and electrical network constraints.

PRESENTATION OF THE INVENTION

One of the objectives of the invention is to simplify the currently existing architectures while improving the performance of the device.

To this end, the invention proposes a device comprising:
- a first hydraulic apparatus and a second hydraulic apparatus, the two motors being connected by a first line and a second line allowing the intake or the discharge of oil into said motors,
- a booster pump, disposed between a reservoir and a booster line, the booster line being in communication with at least one of said lines and being able to allow the boosting of said lines by the booster pump, characterized in that the pump is configured to be able to aspirate oil into the booster line to allow the decompression of said first and second lines.

Thanks to the activation of the pump in aspiration in the booster circuit, the second transient phase is improved by accelerating the vacuum of the first and second lines. The circulation, in the reverse direction of booster operation, of flow through the pump, may be passive (extinction of the pump and decompression of the lines) or active (control of the pump). In the description hereafter the term "aspiration" will be used to cover this concept.

More precisely, a first aspect for the invention proposes a device wherein the pump is configured to aspirate, via the booster line, oil from the first or the second line, the oil being discharged to the reservoir by said pump.

In this context, according to other advantageous features of the invention:

the device further comprises a low pressure selector valve between the first and second lines and connected to the booster line, said selector valve selecting the lower pressure line among the first and second lines, so that the oil is aspired in the lower pressure line and is discharged to the reservoir thanks to said pump (can circulate in the reverse direction of operation during boosting and decompress itself in the reservoir through the booster line and the booster pump).

pressure limiters are disposed in parallel with the selector valve between the booster line and the first and second lines, so as to protect the latter two from excess pressure.

the low pressure selector valve is an inverse shuttle valve always leaving the line with the lower pressure among the first and second lines in communication with the booster line.

the low pressure selector valve comprises two check valves back to back, each comprising a sealing element, for example a ball and a seat, the sealings formed for example by balls being separated from one another by a rod preventing the two valves from closing at the same time.

the low pressure selector valve comprises a pressure limiter in parallel with each check valve, the selector valve and the valves forming part of the same valve.

the low pressure selector valve and the pressure limiters are formed by a single valve, said valve comprising a cartridge in which a tappet may slide, and a pin along the longitudinal axis X-X' of the valve, wherein:

the tappet separates the cartridge into a first volume fed by the first line and into a second volume fed by the second line, the two volumes being able to communicate with one another through an inner channel comprised in the tappet, the tappet defines an annular volume with the cartridge, the annular volume communicating alternately with the first or the second volume depending on the position in translation of the tappet in the cartridge along the longitudinal axis X-X', the pin comprises a first end suitable for blocking said channel in a rest position, and a second end in contact with a spring which holds the pin in the rest position, the pin being movable in translation along the longitudinal axis X-X' to open or block the inner channel, so that when the channel is blocked, the position of the tappet is a function of the forces originating in the pressures of the first volume and of the second volume exerted on either side of the tappet, and the booster line is thus placed in communication with the line which has the lower pressure among the first and second lines, the pin comprises a first surface leading into the first volume on which is exerted a force originating from the pressure of the first volume, and a second surface leading into the second volume on which is exerted a force originating from the pressure of the second volume, the two forces both opposing the force of the spring, so that, when the two forces are greater than that of the spring, the pin undergoes translation and opens said channel, thus placing in communication the high and low pressure lines.

Unlike known architectures where the booster pump serves only for pumping and feeding the booster line with oil, this aspect of the invention proposes to use the booster pump for aspirating oil and thus favoring disengagement. The activation in aspiration in the booster line occurs during a suitable time interval (depending on the volume of oil and the characteristics of the pump). Thus, the disengagement phase which was passive until now (stoppage of control of a valve with, in particular, shutoff of the booster pump), becomes active.

Besides the elimination of an electromechanical valve command, the vacuum line may be eliminated, hence a simplification of the architecture.

And a second aspect proposes a device further comprising a vacuum valve with a control spool, and a vacuum line, said valve having:

an uncontrolled rest position, wherein:
the first line, the second line (or a shuttle valve selecting the line with the higher pressure among the first line and the second line) is connected to the reservoir via the vacuum line,
the booster line is closed,
a controlled position, wherein:
the booster line is connected to the high pressure line or the low pressure line,
the vacuum line is closed, characterized in that the control spool is controlled by the pressure of the booster line, so that said valve is controlled hydraulically by the booster pump and that the aspiration of oil into the booster line by said booster pump causes the vacuum valve to be placed in the rest position, allowing the decompression of the first and second lines.

Unlike the prior art where the vacuum valve was electrically controlled, the valve here is dually controlled hydraulically. In this manner, the control is purely hydraulic and the vacuum is accelerated due to the aspiration of the pump. In this case, the passive version of the vacuum (simple decompression of the booster line without activation of the pump in the reverse direction of booster operation) is then more easily achievable. The solution remains compatible with active vacuum, which is faster.

In this context, according to other advantageous features of the invention:

the vacuum valve comprises a sealed intermediate position preventing any communication between the high and low pressure lines on the one hand, and the booster line and the reservoir on the other hand.

aspiration occurs by reversing the direction of rotation of the pump.

the pump is a reverse displacement pump, so that aspiration is accomplished by negative displacement and not by reversing the direction of rotation of the pump.

the pump is a variable displacement pump.

Finally, the invention proposes a method (following claim).

PRESENTATION OF THE FIGURES

Figure 3:
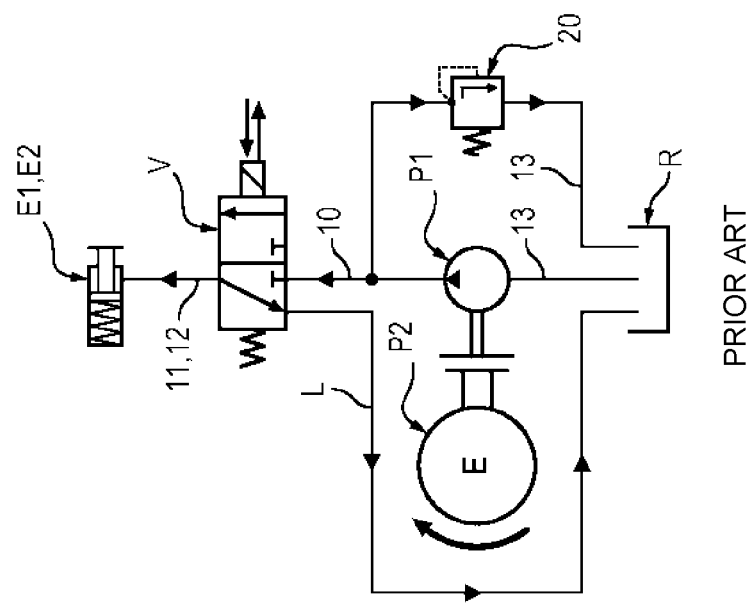
Figure 4:
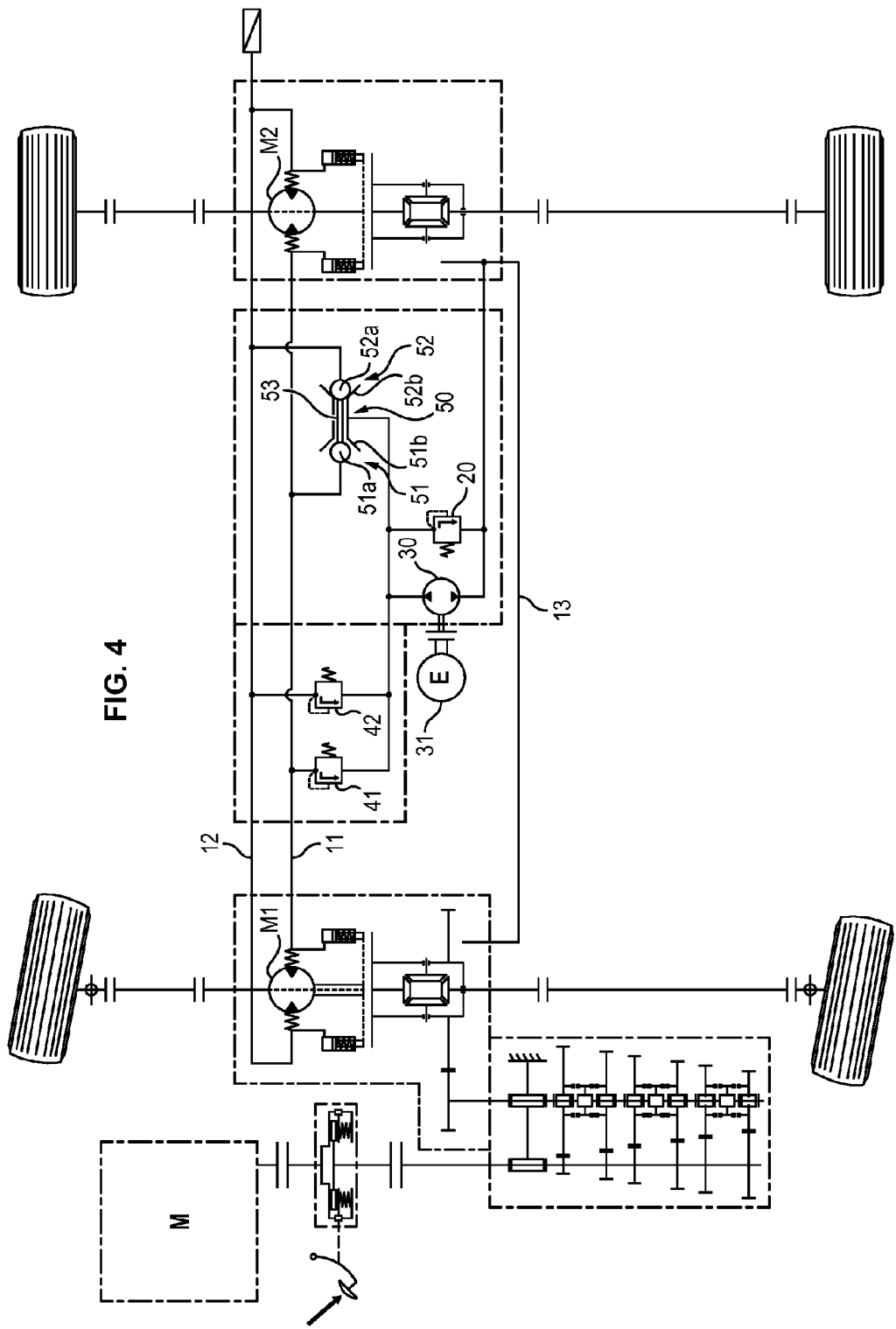
Figure 5:
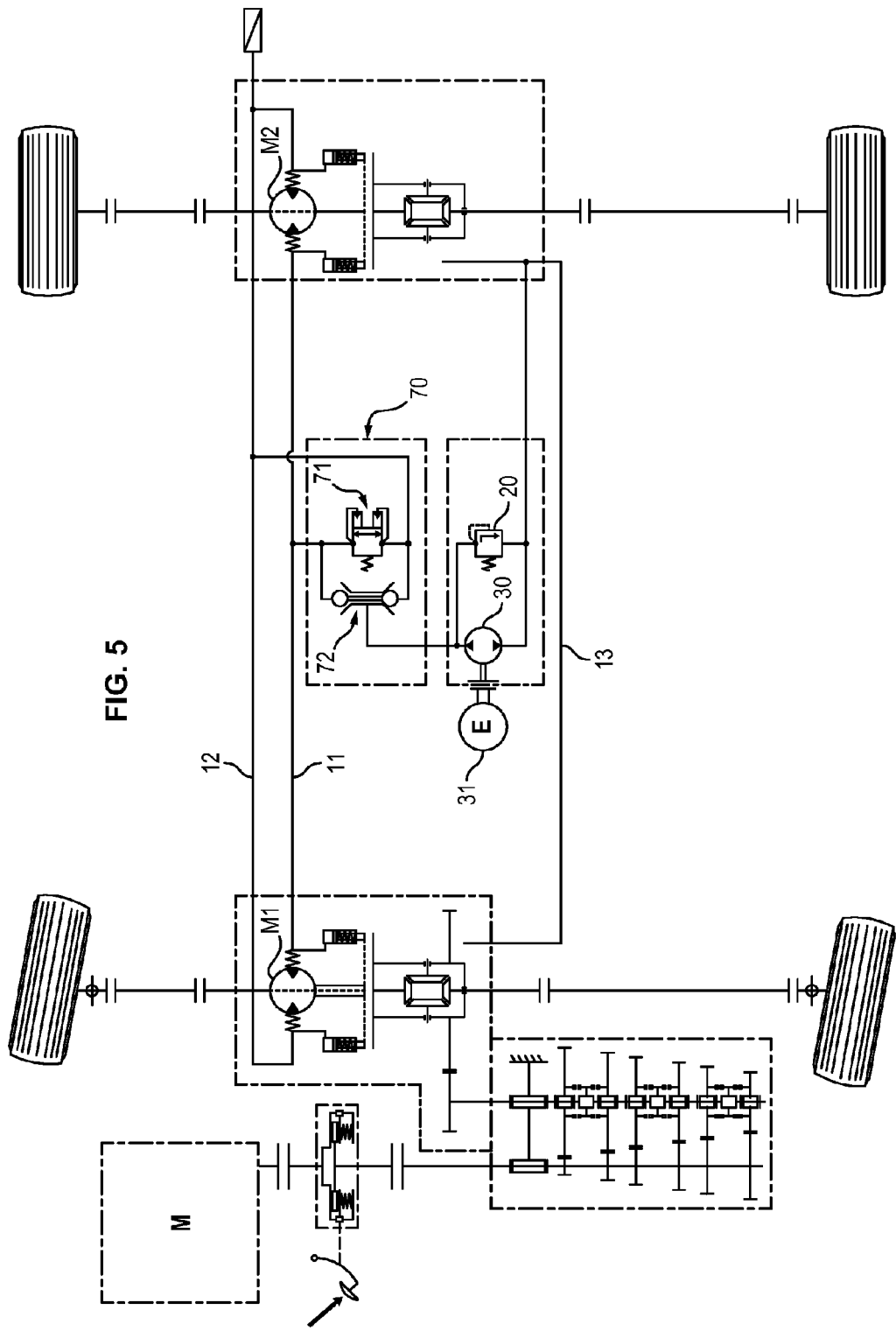
Figure 6:
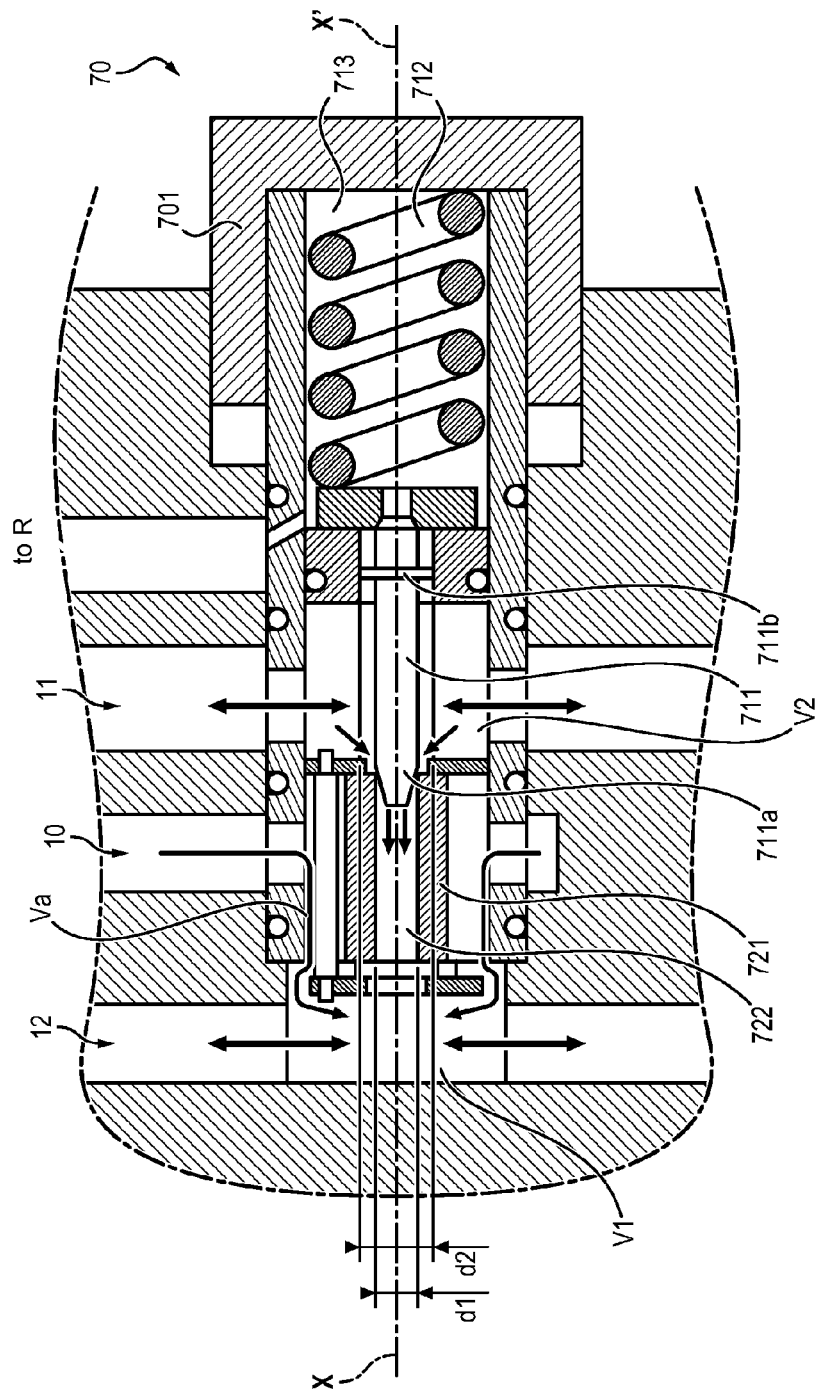
Figure 7:
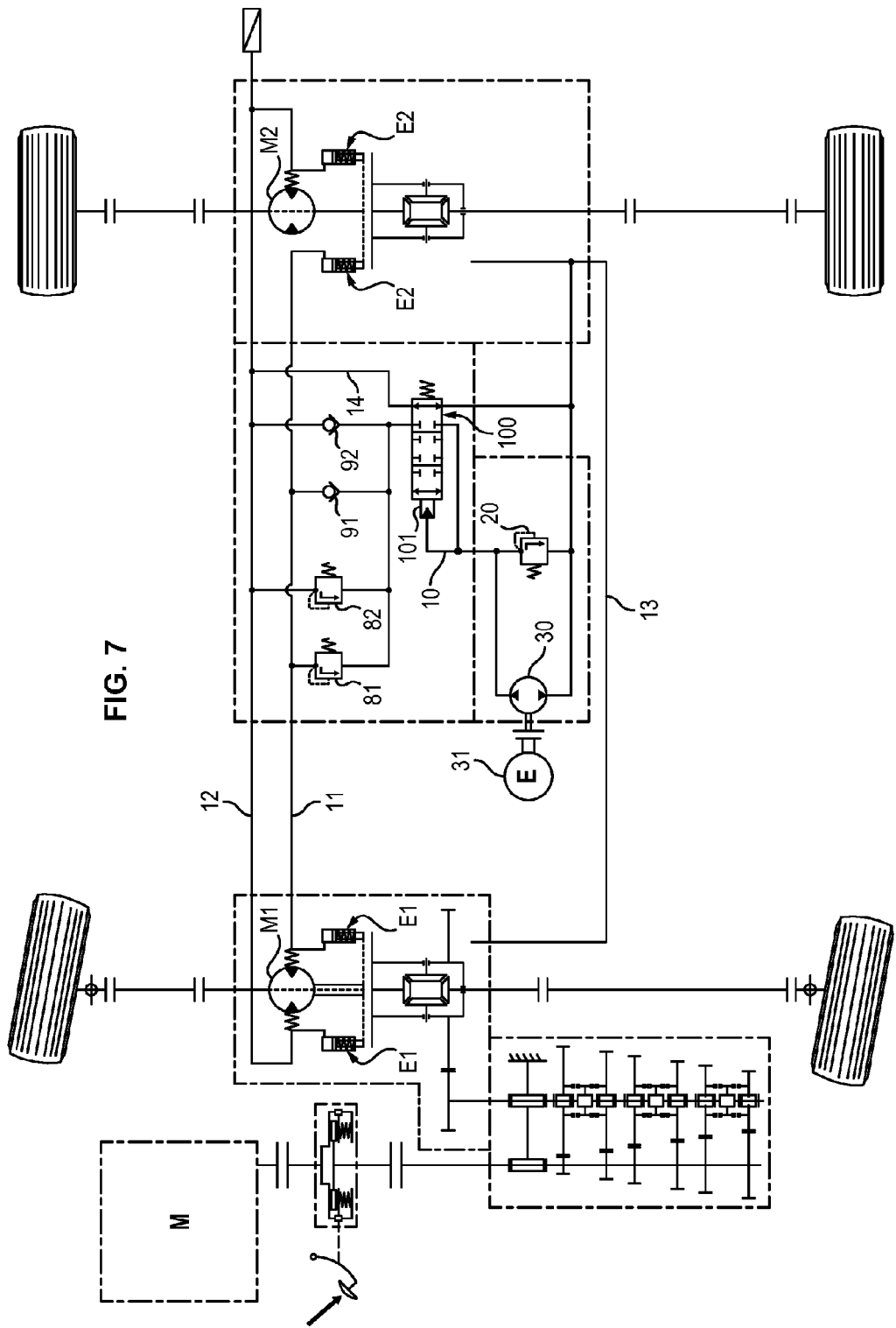
Figure 8:
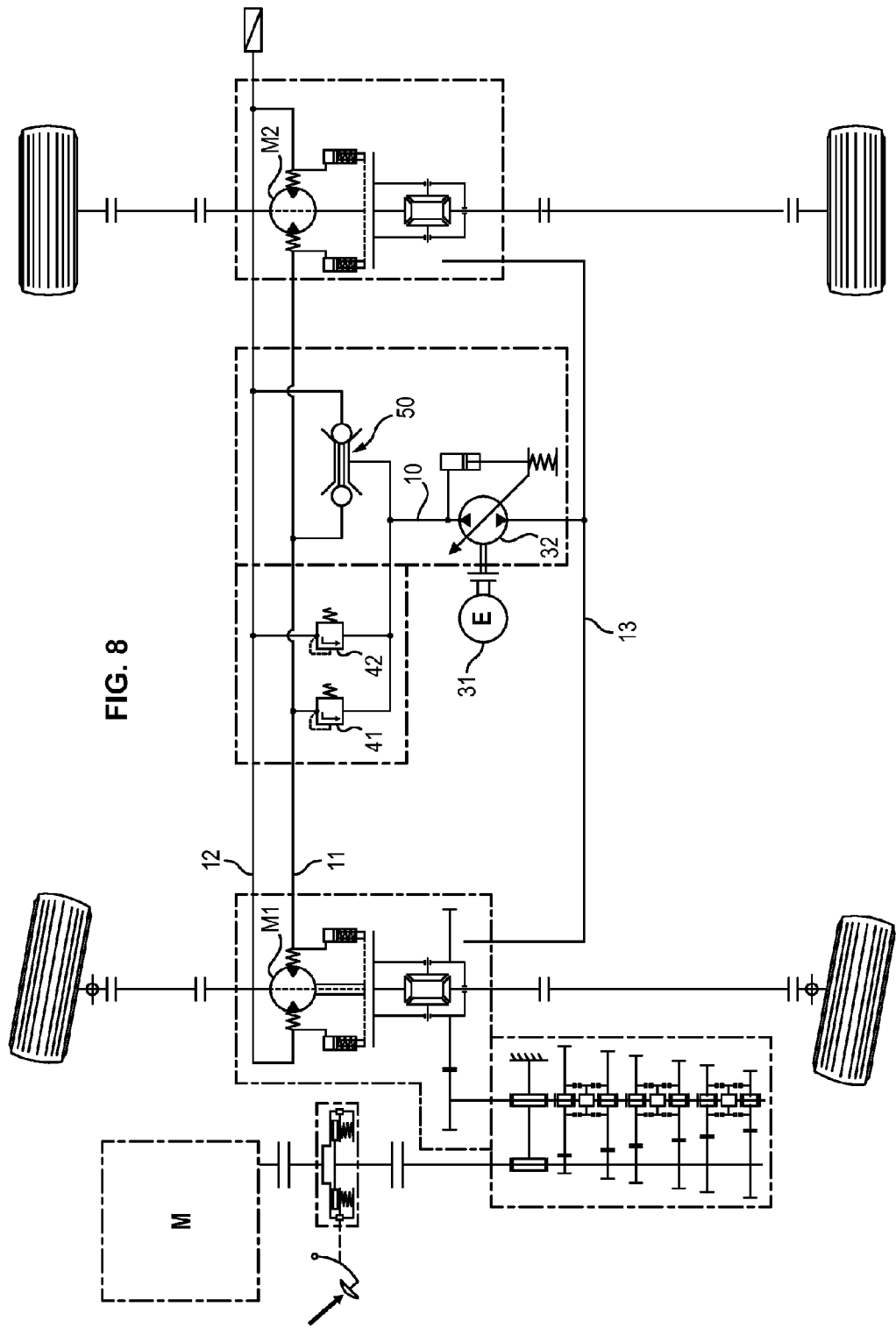
Figure 9:
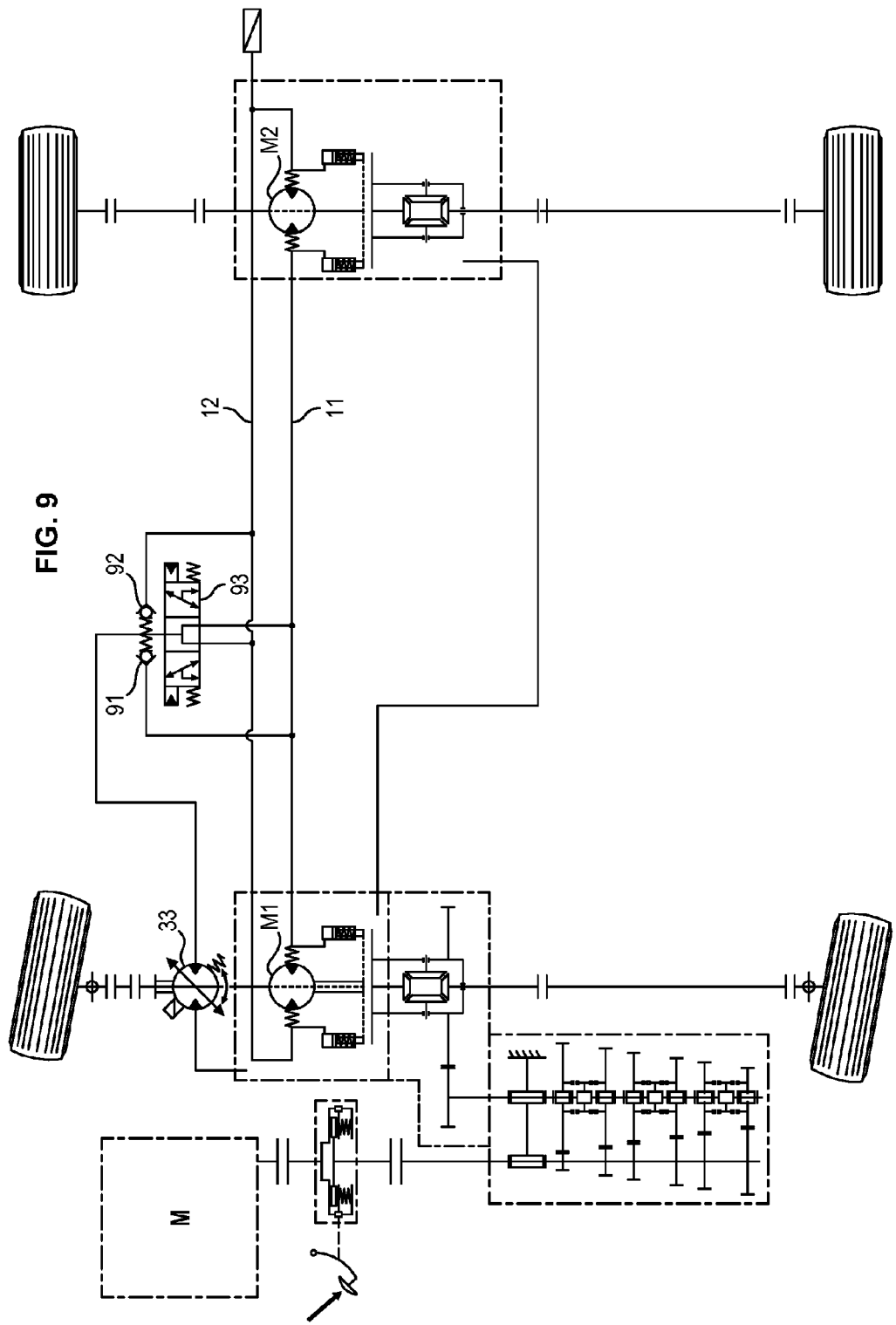
Figure 10:
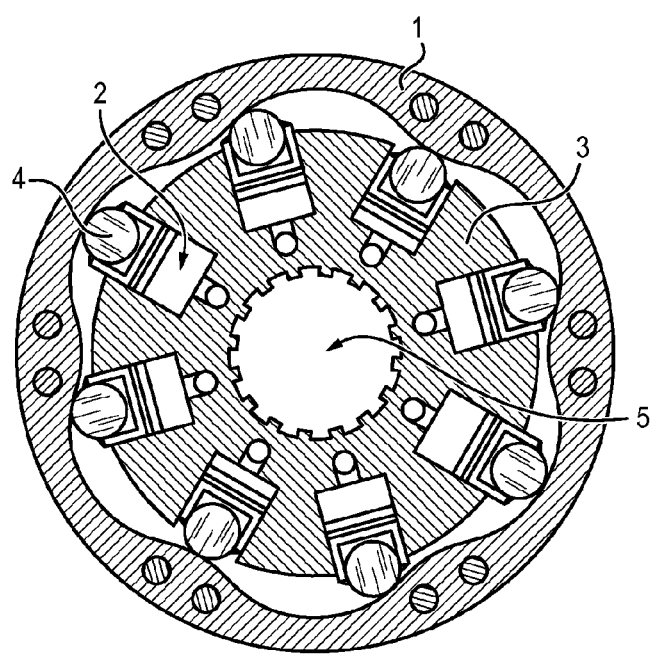

Other features, aims and advantages of the invention will be revealed from the description that follows, which is purely illustrative and not limiting, and which must be read with reference to the appended drawings, wherein:

FIG. 1 shows a hydraulic circuit and particularly a booster circuit as known in the prior art, FIG. 2 shows a schematic of the prior art, FIG. 3 shows a schematic of one aspect of the invention, FIG. 4 shows a circuit of a first embodiment of one aspect of the invention, FIG. 5 shows a circuit of a second embodiment of the same aspect of the invention, FIG. 6 shows a valve allowing the implementation of the circuit of FIG. 5, FIG. 7 shows a circuit of an embodiment according to another aspect of the invention, FIG. 8 shows another embodiment of the booster pump, FIG. 9 shows another embodiment of the booster pump, integrated into another embodiment of the circuit, FIG. 10 shows a schematic of a portion of a hydraulic machine.

DETAILED DESCRIPTION

At present, several aspects and several embodiments of these aspects will be described.

The device comprises two hydraulic machines M1, M2 in "bicycle chain" operation, as mentioned in the introduction.

These machines M1, M2 are linked together by a first line 11 and a second line 12 and feed the machines with oil.

Depending on the operating modes, the direction of circulation of the oil and the pressure in these lines 11, 12 may change.

For example, when the equipped vehicle is driven forward and in "torque addition" mode, the first machine M1 acts as a pump and the second machine M2 acts as a motor. Considering that the first line 11 connects the discharge of the first machine M1 to the intake of the second machine M2 and that the second line 12 connects the discharge of the second machine M2 to the intake of the first machine M1, in this case there will be high pressure in the first line 11 and low pressure in the second line 12 and a direction of circulation of the oil from the first machine M1 toward the second M2 in line 11.

What is meant by high pressure is pressures which may be greater than a few hundred bars, for example 400 bars, and low pressures are pressures of a few tens of bars, for example 10 or 30 bars. The low pressure is differentiated from the pressure of the unpressurized oil reservoirs, represented for example by the casings of the machines M1 and M2, and the unpressurized reservoir R, substantially connected to atmospheric pressure. The pressure at low pressure differing from atmospheric pressure is, in known fashion, necessary for proper operation of a closed-circuit transmission.

In operation, a closed loop transmission has a HP line and a LP line. If no torque is produced by the machines, the two lines are at LP pressure, which is a minimal pressure for the closed circuit during operation.

Driving in reverse, the direction of circulation of the oil is reversed and the high pressure is then found in the second line 12 and the low pressure in the first line 11.

Similarly, when the vehicle is under "restraint," while going downhill for example, the pressure may also change in lines 11, 12.

These machines M1, M2 are clutched, i.e. engaged, thanks to couplers E1, E2 fed hydraulically by the first and second lines 11, 12. The couplers shown connect the blocks of the hydraulic machines to the shafts which pass through them, and make the machines active.

A booster circuit is provided for feeding the lines 11, 12 with oil so as to allow the engagement of the machine M1, M2, and also to compensate for oil leaks. This circuit allows the lines to which it is connected to be held at the low pressure minimal pressure, called the boost pressure. The lines 11 and 12 are therefore always at the boost pressure when the system is activated.

For this purpose, a booster pump 30, which will be called the "pump 30" is provided. It is connected to the reservoir R by a drainage line 13 and may feed the first and second lines 11, 12 via a booster line 10 in particular.

The booster pump 30 may deliver oil under a pressure of a few tens of bars, substantially equivalent to the low pressure.

The pressurization of the HP and LP lines of the closed loop by the booster circuit allows the activation of the hydraulic machines M1 and M2 via the actuation of the couplers E1 and E2. Conversely, the removal of oil from the closed loop induces a drop of pressure in the lines, which releases the couplers E1 and E2 and frees the machines M1 and M2, which makes them inactive.

First Aspect of the Invention

FIG. 3 shows a simplified schematic of the first aspect of the invention.

The pump 30 is configured to be able to aspirate oil from the booster line 10 and in particular to discharge it toward the reservoir R via the drainage line 13.

The vacuum is thus accomplished by reversing the direction of operation of the pump 31 and there is no longer a need for a vacuum valve nor a specific vacuum line.

For this purpose, the first and second lines 11, 12 no longer each comprise an autonomous check valve as before. In fact, aspiration in the booster line 10 would lead to the locking of these check valves, which would prevent the oil from returning to the booster line 10.

When hydraulic assistance is required, the device operates conventionally, with activation of the pump 30 to inject oil into the booster line 10, which will then pressurize the first and second lines 11, 12 and if necessary the couplers E1, E2 to engage the machines M1, M2. On the other hand, when hydraulic assistance is no longer required, the pump 30 reverses its direction of operation, i.e. instead of collecting oil in the reservoir R to inject it into the booster line 10, it collects oil in the first and/or second lines 11, 12 via the booster line 10 and sends it to the reservoir R. Thus, the first and second lines 11, 12 are decompressed and the disengagement of the machines M1, M2 is accomplished thanks to aspiration by the pump 30 of the necessary volume of oil.

The disengagement is accomplished rapidly thanks to the aspiration of the pump 30 which is considered to be more effective than a mere vacuum through opening a vacuum valve.

Depending on the architectures, only the line corresponding to that at low pressure when driving forward and with torque addition, among the two lines 11, 12, is connected to the booster line 10.

More precisely, the vacuum produces cavitation in the cylinders of the hydraulic machines M1, M2. The decompression of the lower pressure line creates dead volumes under the pistons and, due to the rotation of the machines M1, M2, the dead spaces are filled by the high pressure line, which allows the vacuum of the of the higher pressure line as well. When the machines M1, M2 turn, one of them will collect oil in the higher pressure line, toward the low pressure line, where it will be aspirated through the valve. Furthermore, the low pressure line being emptied, the pressure will therefore decrease in both lines at the same time. Thus the invention allows, on this particular circuit, reducing the pressure in both lines, even if only one of them is connected directly to the pump. The expression "directly connected" must be understood to signify "without passing through another hydraulic machine" or "connected by an open valve to the line going in the direction of the booster pump."

This is a voluntary cavitation method, caused in particular by the aspiration of the pump 30, which accelerates the vacuum.

Thus this is a transition from a passive vacuum (stoppage of control of the pump and of the vacuum valve) to an active vacuum, while eliminating a valve (the vacuum valve) and materially eliminating a line (the vacuum line present in the prior art).

In the present case, the pump 30 is fed here by and electric unit 31, forming an electric pump unit EPU. A pressure limiter 20 is disposed in parallel with the pump 30, in a conventional manner.

In the case of a the electric pump 30, 31, the reversal of the direction of rotation of the electric motor 31 causes the pump 30 to operate in reverse direction. The speed, the duration of activation are functions of the volume of oil to be aspirated and of the features of the device, such as the cylinder displacement.

It is thus necessary to have an EPU 30, 31 available which may operate in both directions of rotation.

The use of an electric unit 31 is not unique to the first aspect, nor limiting.

Several embodiments of this first aspect are possible.

As shown in FIG. 4, the booster line 10 is advantageously connected to the first and second lines 11, 12, by a low pressure selector valve 50 (an "inverse shuttle valve"). This allows the lower pressure line to always be boosted (when the vehicle is in reverse or under restraint, the pressures in lines 11, 12 may be reversed).

The selector valve 50 leaves the lower pressure line constantly open with the booster line 10.

In this configuration, pressure limiters 41, 42 are again found in parallel with the selector valve 50, which protects the first and second lines 11, 12 from possible excess pressure.

The low pressure selector valve 50 is typically constituted from two check valves 51, 52 back to back, each comprising a sealing element, a ball for example, or a valve with a form suitable for the flow rates and pressures of the system. A sealing element, hereafter we will consider a ball 51a, 52a, for example and without limitation, which may be housed in a seat 51a, 51b respectively, to block the passage of oil.

The balls 51a, 52a are held at a minimal distance from one another by a rigid rod 53, so that at one of the two valves 51, 52 is constantly open. The balls 51a, 52a may also be permanently secured to the rigid rod 53. As soon as pressure is higher on one side, the ball 51a, 52a is pressed against the seat 51b, 52b and blocks communication between the line 11, 12, and the booster line 10, thus freeing the opening on the other side between the other line 12, 11 and the booster line 10.

In FIG. 4 for example, the pressure is higher in the second line 12, which causes closure of the valve 52 by the ball 52a, said ball 52a causing, thanks to the rod 53, the opening of the valve 51, thus placing the first line 11, with a lower pressure, with the booster line 10.

There exists an intermediate position where the three lines 10, 11, 12 are open.

In addition, thanks to the rod 53 which holds one of the two valves 51, 52 open, there is no risk of blocking the selector valve 50 when the pump 30 is aspirating in the booster line 10 and creates a pressure drop.

FIGS. 5 and 6 show another valve 70 comprising both a pressure limiter 71 and a low pressure selector valve 72. In this valve 70, the limiter 71 is a dual limiter situated between the first and second lines 11, 12.

Excess pressure in one of the two lines 11, 12, will be discharged by spilling oil into the other line 12, 11.

The valve 70 comprises a cartridge 701 in which are found a pin 711 and a tappet 721. These latter two may slide in relative translation along a longitudinal axis X-X'.

The tappet 721 delimits the volume of the cartridge 701 into a first volume V1 fed by the first line 11 and into a second volume V2 fed by the second line 12. The two volumes V1, V2 are not completely independent and may communicate fluidically with one another through an internal channel 722 which is included in the tappet 721.

In addition, the tappet 721 defines, with the cartridge 701, an annular volume Va between said tappet 721 and the cartridge 701. This annular volume Va is always in communication with the booster line 10 and is alternatively in communication with the first or the second volume V1, V2. Thus, even during when the booster pump 10 is aspirating, there is no risk of blockage.

The pin 711 comprises a first end 711a which is suitable for blocking the inner channel 722 in a rest position and for opening it into an operating position. These two positions are obtained by translation of the pin 711 along X-X'. A second end 711b of said pin 711 is in contact with a spring 712 which holds the pin 711 in the rest position.

When the inner channel 722 is blocked, the position of the tappet 721 depends on the pressures exerted in the first and second volumes V1, V2.

When the pressure in the first volume V1 is greater than that of the second volume V2, the tappet 721 places in communication the drainage line 10 with the second volume V2 and therefore the second line 12, When the pressure in the second volume V2 is greater than that of the volume V1, the tappet 721 places in communication the drainage line 10 with the first volume V1 and therefore the first line 11.

Thus, the tappet 721, when it is blocked, has the function of a low pressure selector valve 72.

The pin 711 further comprises a first surface S1 leading into the first volume V1 on which a force is exerted originating from the pressure of the first volume V1. In practice, this first surface S1 corresponding to the surface blocking the inner channel 722. The pin similarly comprises a second surface S2 leading into the second volume V2 and on which a force is exerted originating from the pressure of the second volume V2. In practice, this surface S2 is situated between the volume V2 and a housing 713 of the spring 712.

Both forces are exerted in the same direction and tend to place the pin 711 in the operating position, i.e. to compress the spring 712 and to open the inner channel 722.

Thus, when the sum of these two forces is greater than the force of the spring, the inner channel 722 opens and the two volumes V1, V2 communicate with one another to allow the excess pressure to be discharged from a line 11, 12 to the other 12, 11. The pin 711 and the spring 712 form the pressure limiter 71.

It is possible to obtain different settings between the first volume V1 and the second volume V2, by selecting suitable surfaces S1, S2. In practice, given the pressures involved, (for example 400 bars in one line against 30 bars in the other), only one of the two volumes V1, V2 exerts significant force against the spring 713.

This valve 70 which integrates a limiter 71 which acts with a single spring 713 and which integrates a low pressure selector valve 72 allows better compactness of the device.

Regardless of the embodiment, a device is obtained in which the engagement and disengagement of the machines M1, M2 is controlled only by the booster pump 30 and the reversal of its direction of operation. It is no longer necessary to have recourse to electrically controlled valves.

Second Aspect of the Invention

FIG. 7 shows a hydraulic schematic of the second aspect of the invention.

In this variant, a vacuum valve 100 with a spool 101 and a vacuum line 14 are provided.

The vacuum line 14 connects at least one of the two first or second lines 11, 12 to the reservoir R, via for example the drainage line 13.

In a rest position, the vacuum valve 100:
closes the booster line 10, which signifies that the first and second lines 11, 12 cannot be fed with oil by the pump 30;
opens the vacuum line 14, which allows the vacuum of the device.

In a controlled position, the vacuum valve 100:
opens the booster line 10, which allows the first and second lines 11, 12 to be fed with oil,
closes the vacuum line 14.

The vacuum valve 100 advantageously comprises an intermediate, sealed safe position, in which the booster 10 and vacuum 14 lines are closed.

In this second aspect of the invention, the spool 101 is controlled hydraulically by the booster line 10.

In this manner, when hydraulic assistance is required, the pump 30 is activated, which will pressurize the booster line 10. The spool 101 is then controlled and the vacuum valve switches into the controlled position to allow the boosting of the first and second lines 11, 12. Conversely, when hydraulic assistance is no longer needed, the pump 30 is activated in the reverse direction, which causes the aspiration of oil in the booster line 10 and will accelerate the transition to a rest position of the vacuum valve 100. The decompression of the first and second lines 11, 12 is thus accomplished rapidly and allows the disengagement of the machines M1, M2.

The pressure limiters 81, 82 and check valves 91, 92 are again found (in the direction running from the booster line 10 toward the lines 11, 12) positioned in parallel between the first and second lines 11, 12 and the booster line 10 (when the vacuum valve 100 is in the controlled position).

According to the alternatives, the vacuum line 14 is connected only to the line corresponding to low pressure in forward drive and in torque addition mode.

It is also possible to provide a low pressure selector valve which selects the line with the lower pressure between the first and the second line 11, 12 to connect it to the vacuum line 14.

It is also possible to connect the two lines 11, 12 to the vacuum line 14.

Similarly to the first aspect, a device is obtained in which the engagement and disengagement of the machines M1, M2 is controlled only by the booster pump 30 and the reversal of its direction of operation.

Other Embodiments

Regardless of the aspect of the invention, the disengagement of the hydraulic machines M1, M2 is accomplished thanks to circulation, in reverse of boosting operation, of the flow through the pump, typically thanks to the aspiration of the booster pump 30. This circulation may be passive or active. Several types of pumps may be used.

Recall that the preceding figures showed a pump 30 driven by an electric motor 31 capable of turning in both directions, but this is in no way limiting.

FIG. 8 shows an embodiment wherein the booster pump is a variable displacement pump 32. It is not necessary to have a pressure limiter 20 in parallel. This known type of pump accomplishes a slaving of the displacement of the pump with respect to a set pressure, via a feedback line and a set spring. This type of pump is equivalent to the juxtaposition of a fixed displacement pump and of a pressure limiter.

The variable displacement pump 32 may be applied to all previously described embodiments.

FIG. 9 shows an embodiment wherein the booster pump is a reverse displacement pump 33. The pump 33 always turns in the same direction, but the change of displacement to a negative displacement will cause aspiration.

The general principle of the embodiments described remains the same.

In addition, FIG. 9 shows, independently of the reverse displacement pump 33, an architecture wherein the pump is driven by an axle of the vehicle (with a reducer and a coupler, of the disk clutch type, if necessary).

This alternative nevertheless relates primarily to the pump 33 because it would otherwise be necessary to integrate a rotation reverser between the axle and the pump to be able to cause aspiration.

Found again in FIG. 9 is a function for limiting pressure in both lines, for example in the form of the pressure limiters 91, 92 in the form of controlled check valves as well as a selector valve 93 as described previously.

The pump may also be driven in rotation by the heat engine M directly.

The Hydraulic Machines M1, M2

The hydraulic machines M1, M2 are preferably radial piston machines as shown schematically for example in FIG. 10, comprising:
a lobed cam 1,
a plurality of pistons 2 disposed radially in a cylinder block 3, the pistons 2 each comprising a roller 4 capable of rolling on the lobed cam 1,
a shaft 5, which may be secured to the cylinder block when in particular the couplers E1, E2 are engaged.

These machines convert hydraulic energy into mechanical energy due to the variation in displacement of the pistons when they follow the lobed cam.

Such machines M1, M2 have relatively low rotation speeds but have high torque.

Such machines M1 and M2 are preferably placed in a vehicle so as to turn at the speed of the wheels that they must drive, without overdrive or reduction of speed. If there is one machine per axle, this means the average speed of the two wheels of the axle, via a differential or equivalent system.

A casing (not shown) protects the assembly. The casing may serve as a reservoir R. The reservoir R is substantially at atmospheric pressure. It may be connected via breathers, filters or valves, which may create a very slight pressure difference with respect to the outside.

The invention claimed is:

1. A device comprising:
a first hydraulic apparatus and a second hydraulic apparatus, the two hydraulic apparatus being connected by a first line and a second line allowing the intake or the discharge of oil into said hydraulic apparatus,
a booster pump, disposed between a reservoir and a booster line, the booster line being in communication with at least one of said lines and being able to allow the boosting of said lines by the booster pump,
wherein
the first and second hydraulic apparatus are engageable using couplers fed hydraulically by the first and second lines, the pump is configured to be able to aspirate oil into the booster line to allow the decompression of said first and second lines.

2. The device according to claim 1, wherein the pump is configured to aspirate, via the booster line, oil from the first or the second line, the oil being discharged to the reservoir by said pump.

3. The device according to claim 2, further comprising a low pressure selector valve between the first and second lines and connected to the booster line, said selector valve selecting the lower pressure line among the first and second lines, so that the oil may circulate in the reverse direction of operation during boosting and decompress itself in the reservoir through the booster line and the booster pump, advantageously aspired in the lower pressure line and discharged to the reservoir thanks to said pump.

4. The device according to claim 3, wherein pressure limiters are disposed in parallel with the selector valve between the booster line and the first and second lines, so as to protect the first and second lines from excess pressure.

5. The device according to claim 3, wherein the low pressure selector valve is an inverse shuttle valve always leaving the line with the lower pressure among the first and second lines in communication with the booster line.

6. The device according to claim 5, wherein the low pressure selector valve comprises two check valves back to back, each comprising a sealing element.

7. The device according to claim 6, wherein the low pressure selector valve comprises a pressure limiter in parallel with each check valve, the selector valve and the valves forming part of the same valve.

8. The device according to claim 3, wherein the low pressure selector valve and the pressure limiters are formed by a single valve, said valve comprising a cartridge in which a tappet may slide, and a pin along a longitudinal axis of the valve, wherein:
the tappet separates the cartridge into a first volume fed by the first line and into a second volume fed by the second line, the two volumes being able to communicate with one another through an inner channel comprised in the tappet,
the tappet defines an annular volume with the cartridge, the annular volume communicating alternately with the first or the second volume depending on the position in translation of the tappet in the cartridge along the longitudinal axis,
the pin comprises a first end suitable for blocking said channel in a rest position, and a second end in contact with a spring which holds the pin in the rest position, the pin being movable in translation along the longitudinal axis to open or block the inner channel,
so that when the channel is blocked, the position of the tappet is a function of the forces originating in the pressures of the first volume and of the second volume exerted on either side of the tappet, and the booster line is thus placed in communication with the line which has the lower pressure among the first and second lines,
the pin comprises a first surface leading into the first volume on which is exerted a force originating from the pressure of the first volume, and a second surface leading into the second volume on which is exerted a force originating from the pressure of the second volume, the two forces both opposing the force of the spring,
so that, when the two forces are greater than that of the spring, the pin undergoes translation and opens said channel, thus placing in communication the high and low pressure lines.

9. The device according to claim 1, further comprising a vacuum valve with a control spool, and a vacuum line, said valve having:
an uncontrolled rest position, wherein:
the first line, the second line or a shuttle valve selecting the line with the higher pressure among the first line and the second line, is connected to the reservoir via the vacuum line,
the booster line is closed,
a controlled position, wherein:
the booster line is connected to the high pressure line or the low pressure line,
the vacuum line is closed,
characterized in that the control spool is controlled by the pressure of the booster line, so that said valve is controlled hydraulically by the booster pump and that the aspiration of oil into the booster line by said booster pump causes the vacuum valve to be placed in the rest position, allowing the decompression of the first and second lines.

10. The device according to claim 9, wherein the vacuum valve comprises a sealed intermediate position preventing any communication between the high and low pressure lines on the one hand, and the booster line and the reservoir on the other hand.

11. The device according to claim 1, wherein aspiration occurs by reversing the direction of rotation of the pump.

12. The device according to claim 1, wherein the pump is a reverse displacement pump, so that aspiration is accomplished by negative displacement and not by reversing the direction of rotation of the pump.

13. The device according to claim 1, wherein the pump is a variable displacement pump.

14. A vacuum method of a device according to claim 1, wherein the booster pump is activated in aspiration in the booster line to allow the disengagement of the machines.

15. The method according to claim 14, wherein the activation in aspiration of the pump is accomplished by reversing the direction of rotation of an electric motor driving the pump.

16. The method according to claim 14, wherein the activation in aspiration of the pump is accomplished by reversing the displacement of the pump, without changing its direction of rotation.

17. The device according to claim 5, wherein each of the sealing elements comprises a ball and a seat, wherein sealings are formed by the balls being separated from one another by a rod preventing the two valves from closing at the same time.

* * * * *